(12) United States Patent
Tanaka

(10) Patent No.: US 10,464,220 B2
(45) Date of Patent: Nov. 5, 2019

(54) APPARATUS AND METHOD FOR DETECTING DAMAGE TO LINEAR GUIDE

(71) Applicant: FANUC CORPORATION, Yamanashi (JP)

(72) Inventor: Akira Tanaka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/977,261

(22) Filed: May 11, 2018

(65) Prior Publication Data

US 2018/0333868 A1 Nov. 22, 2018

(30) Foreign Application Priority Data

May 19, 2017 (JP) ................................ 2017-099781

(51) Int. Cl.
| | |
|---|---|
| *B25J 5/02* | (2006.01) |
| *G05B 19/401* | (2006.01) |
| *B25J 19/00* | (2006.01) |
| *B25J 9/16* | (2006.01) |

(52) U.S. Cl.
CPC ............. *B25J 19/0095* (2013.01); *B25J 5/02* (2013.01); *B25J 9/1674* (2013.01); *B25J 9/1692* (2013.01); *G05B 2219/39013* (2013.01); *G05B 2219/39024* (2013.01); *G05B 2219/39029* (2013.01); *G05B 2219/39041* (2013.01)

(58) Field of Classification Search
CPC ........ B25J 19/0095; B25J 5/02; B25J 9/1674; B25J 9/1692; G05B 2219/39024; G05B 2219/39013; G05B 2219/39029; G05B 2219/39041
See application file for complete search history.

(56) References Cited

U.S. PATENT DOCUMENTS

| | | | | |
|---|---|---|---|---|
| 6,681,145 | B1* | 1/2004 | Greenwood | ........... B25J 9/1692 700/176 |
| 9,211,643 | B1* | 12/2015 | Shirakyan | ............. B25J 9/1697 |
| 2004/0144759 | A1 | 7/2004 | Cho et al. | |
| 2005/0073767 | A1* | 4/2005 | Goodman | ............. B25J 9/1692 360/69 |
| 2007/0188117 | A1 | 8/2007 | Shoda et al. | |

(Continued)

FOREIGN PATENT DOCUMENTS

| | | |
|---|---|---|
| CN | 104132636 A | 11/2014 |
| CN | 105486255 A | 4/2016 |

(Continued)

*Primary Examiner* — Herbert K Roberts
(74) *Attorney, Agent, or Firm* — Hauptman Ham, LLP

(57) ABSTRACT

An apparatus and a method for detecting damage to a linear guide on which a robot is mounted, by using a simple configuration. The apparatus has: a length measuring sensor configured to measure a position of a predetermined portion of the robot at predetermined time intervals; a current detecting section configured to detect a current value of a drive motor for driving a slide; and a judging section such as a processor, configured to, when the measured distance between the predetermined portion of the robot and the length measuring sensor is out of a range defined by a predetermined first threshold, and when the current value of the drive motor is equal to or higher than a predetermined second threshold, judge that the linear guide has been damaged.

5 Claims, 4 Drawing Sheets

(56) References Cited

U.S. PATENT DOCUMENTS

| | | | |
|---|---|---|---|
| 2008/0004750 A1* | 1/2008 | Ban | B25J 9/1692 700/245 |
| 2011/0254566 A1 | 10/2011 | Gluck et al. | |
| 2016/0339585 A1* | 11/2016 | Webster | B25J 9/1638 |
| 2018/0154523 A1* | 6/2018 | Jeong | B25J 9/1692 |

FOREIGN PATENT DOCUMENTS

| | | | |
|---|---|---|---|
| CN | 106017889 A | | 10/2016 |
| EP | 0705665 A1 | | 4/1996 |
| JP | 7-178690 A | | 7/1995 |
| JP | 07178690 A | * | 7/1995 |
| JP | 2003-307230 A | | 10/2003 |
| JP | WO/2006/001479 A1 | | 1/2006 |
| JP | 2010-96541 A | | 4/2010 |

\* cited by examiner

APPARATUS AND METHOD FOR DETECTING DAMAGE TO LINEAR GUIDE

RELATED APPLICATIONS

The present application claims priority to Japanese Application Number 2017-099781, filed on May 19, 2017, the disclosure of which is hereby incorporated by reference herein in its entirety.

BACKGROUND OF THE INVENTION

1. Field of the Invention

The present invention relates to an apparatus and a method for detecting damage to linear guide.

2. Description of the Related Art

In a robot system including a robot used to convey an article, etc., a linear guide may be used as a traveling unit for moving the robot (e.g., see JP H07-178690 A).

In order to detect an abnormality of a linear guide, a technique for utilizing a current value of a motor for driving a slide (or a traveling part) of the linear guide is well known (e.g., see JP H07-178690 A or WO 2006/001479 A1). On the other hand, a technique for sensing an abnormality of the linear guide, by detecting or monitoring the vibration and temperature of the linear guide, is well known (e.g., see JP 2003-307230 A).

The current value of the motor for driving the slide of the linear guide is changed (usually, is increased) when the slide or a guide rail of the linear guide is damaged. In addition, the current value of the motor may be changed when an abnormality occurs in a component. (e.g., a rack gear, a speed reducer, or a motor) other than the slide or the guide rail. Therefore, when using the current value of the motor, it is difficult to correctly detect only the damage to the slide or the guide rail.

On the other hand, in order to detect or monitor the vibration and temperature, a sensor capable of simultaneously detecting the vibration and temperature is necessary, whereby an apparatus including the linear guide may be complicated and costly. Thus, a technique for detecting the damage to the slide or the guide rail of the linear guide used as the traveling unit for the robot, by using a simple configuration, is desired.

SUMMARY OF THE INVENTION

One aspect of the present disclosure provides an apparatus for detecting damage to a linear guide having a slide on which a robot is mounted and a guide rail configured to guide the slide, the apparatus comprising: a length measuring sensor configured to measure a distance between a predetermined portion of the robot and a fixed position other than the robot; a current detecting section configured to detect a current value of a drive motor for driving the slide; and a judging section configured to, when the distance measured by the length measuring sensor is out of a range defined by a predetermined first threshold, and when the current value of the motor is equal to or higher than a predetermined second threshold, judge that the linear guide has been damaged.

Another aspect of the present disclosure provides method for detecting damage to a linear guide having a slide on which a robot is mounted and a guide rail configured to guide the slide, the method comprising the steps of: storing predetermined first and second thresholds; measuring a distance between a predetermined portion of the robot and a fixed position other than the robot; detecting a current value of a drive motor for driving the slide; and judging, when the distance is out of a range defined by the first threshold, and when the current value of the motor is equal to or higher than the second threshold, judge that the linear guide has been damaged.

BRIEF DESCRIPTION OF THE DRAWINGS

The above and other objects, features and advantages of the present invention will be made more apparent by the following description, of the preferred embodiments thereof, with reference to the accompanying drawings wherein:

FIG. 3 is a flowchart exemplifying a procedure in the damage detecting apparatus of FIG. 1; and.

DETAILED DESCRIPTIONS

Figure 1:
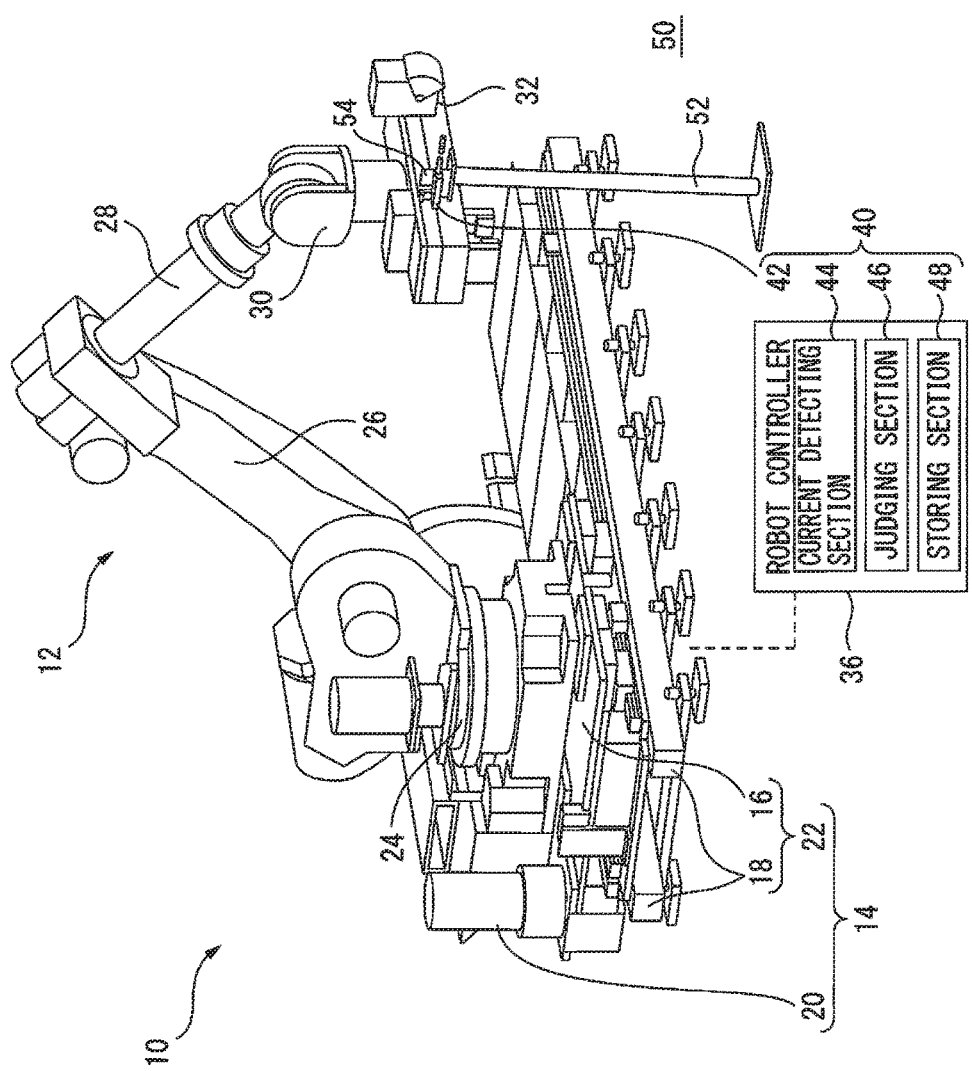
FIG. 1 shows an example of a configuration of a robot system including a damage detecting apparatus according to an embodiment.

FIG. 1 shows an example of a configuration of a robot system including a damage detecting apparatus according to a referred embodiment of the present disclosure, and a linear guide subject to damage detection. System 10 has a robot 12, and a robot traveling unit 14 configured to (in the drawing, straightly) move robot 12 within a predetermined range. Robot traveling unit 14 has a slide (block) 16 on which robot 12 is mounted, a guide rail 18 configured to guide slide 16 (in the drawing, generally in the horizontal direction), and a drive motor 20 configured to drive slide 16. In this case, slide 16 and guide rail 18 cooperatively constitute a linear guide 22. Although a rack-pinion or a ball screw may be used as a mechanism for driving slide 16 by using the motor, the mechanism is not limited as such.

Although the type and the structure of robot 12 are not limited particularly, robot 12 in the drawing is a multi-joint robot having six axes. Concretely, robot 12 has a rotating body 24 mounted on slide 16 and rotatable about a generally vertical axis, an upper arm 26 rotatably attached to rotating body 24, a forearm 28 rotatably attached to upper arm 26, a wrist element 30 rotatably attached to forearm 28, and an end effector 32 such as a robot hand rotatably attached to wrist element 30. Robot 12 is configured to carry out a predetermined operation, e.g., holding and conveying an article such as a machined part (not shown). In addition, (a motor of each axis of) robot 12 and linear guide 22 (or drive motor 20) can be controlled by a robot controller 36 connected to robot 12 and traveling unit 14.

Damage detecting apparatus 40 has: a length measuring sensor 42 configured to measure a distance between a predetermined portion (in the drawing, end effector 32) of robot 12 and a fixed (stationary) position other than robot 12 at predetermined first time intervals; a current detecting section 44 configured to detect a current value (or a traveling axis motor current value) of drive motor 20 for driving slide 16 at predetermined second time intervals; and a judging section 64 such as a processor, configured to, when the distance measured by length measuring sensor 42 is out of a range defined by a predetermined first threshold, and when the current value of drive motor 20 is equal to or higher than a predetermined second threshold, judge that the linear guide has been damaged. Further, damage detecting apparatus 40 may have a storing section 48 such as a memory, configured to store the first and second thresholds. In the example of FIG. 1, current detecting section 44, judging section 46 and storing section 48 may be incorporated in robot controller 36. However, at least one of these sections may be constituted as an arithmetic processing unit such as a personal computer, which is separated from robot controller 36, and may be used by being connected to robot controller 36.

Figure 2:
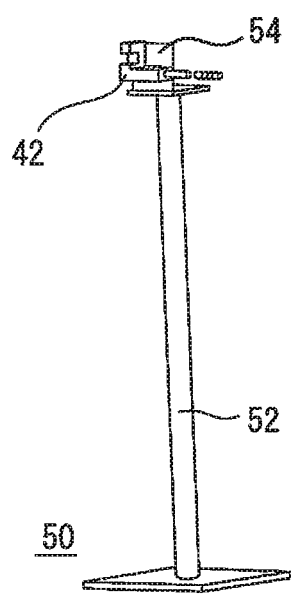
FIG. 2 is an example of a configuration of a length measuring sensor included in the robot system of FIG. 1.
Figure 3:
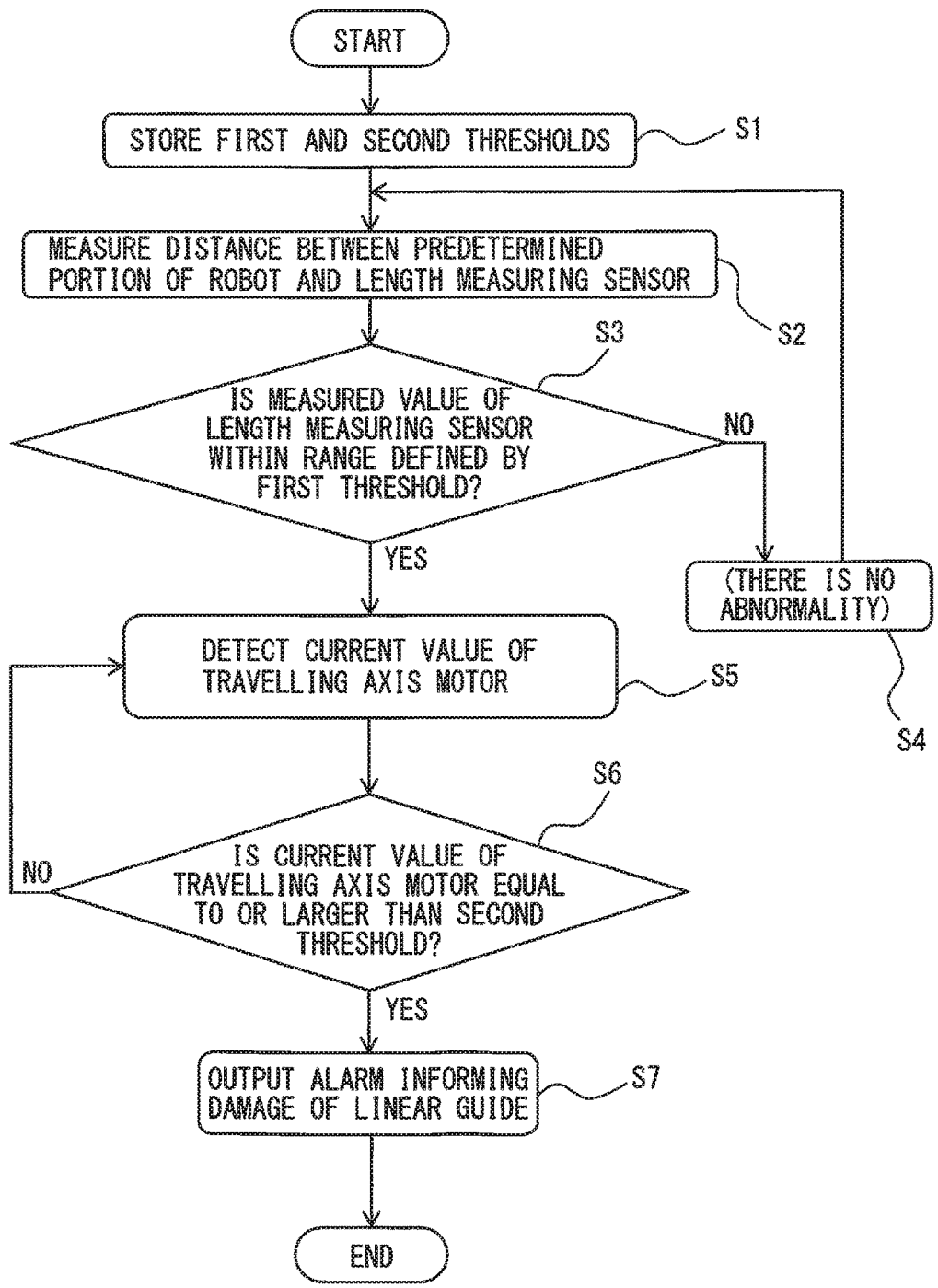

FIG. 2 is a view showing an example of the position and structure of length measuring sensor 2. For example, length measuring sensor 2 may be a laser distance meter, fixed to a floor 50 (in the drawing, fixed to a bracket 54 arranged at an upper part of a support post 52 located on the floor), and configured to irradiate a laser beam 56 toward a predetermined portion (e.g., a part of end effector 32) of robot 12 and then receive a reflected beam from the predetermined portion. Due to such a configuration, the distance between the fixed position other than robot 12 (in this case, the body of length measuring sensor 42) and end effector 32 can be measured. Therefore, by measuring the distance at the predetermined time intervals, the temporal change in the position of end effector 32 can be calculated or obtained.

The predetermined portion of the robot measured by length measuring sensor 42 is not limited to end effector 32, for example, may be a portion of rotating body 24, upper arm 26 or forearm 28. In this regard, in order to detect the damage to slide 16 or guide rail 18 with high sensitivity, it is preferable that the predetermined portion be a part (e.g., wrist element 30 or end effector 32) of robot 12 which is physically away from slide 16 as possible. This is because, for example, when slide 16 (or robot 12) is slightly inclined in the direction including a component perpendicular to the longitudinal direction of guide rail 18 due to microscopic damage to the guide rail, a displacement of end effector 32 of robot 12 is larger than a displacement of rotating body 24.

Length measuring sensor 42 may be any type as long as it can measure the position of the predetermined portion of robot 12 (e.g., the distance between the predetermined portion and the length measuring sensor). For example, a laser displacement meter, a 2-D laser displacement meter, a transmission-type outer diameter/dimension measuring instrument, an image dimension measuring instrument, an eddy current displacement meter, or a contact-type displacement meter, etc., may be used as length measuring sensor 42. In this regard, the length measuring sensor may be attached to robot 12 (e.g., forearm 28 or end effector 32), so that the length measuring sensor can measure the distance between the sensor and another fixed (stationary) position such as a predetermined position on the floor or a fixed structure. However, it is advantageous in terms of a wiring of the length measuring sensor, when length measuring sensor 42 is fixed to floor 50 as shown in the drawing.

Next, with reference to FIG. 2, an example of procedure (or a damage detecting method) in damage detecting apparatus will be explained. First, in step S1, above mentioned storing section 48 stores a first threshold relating to length measurement data obtained by length measuring sensor 42, and a second threshold relating to a current value of the traveling axis motor (e.g., drive motor 20). The first and second thresholds may be experimentally determined based on the structures of robot 12 and slide guide 22, and based on data (or experimental values) in a normal state and an abnormal state (e.g., when the linear guide is damaged). For example, the first threshold may be set to 0.5 mm, 1 mm, 2 mm or 3 mm. Further, the second threshold may be set to a value corresponding to 120% to 130% of a current value in the normal state (i.e., 1.2 to 1.3 times as much as the current value in the normal state).

Next, in step S2, the predetermined portion of robot 12 and the body of length measuring sensor 42 is measured at predetermined first time intervals, by using length measuring sensor 42. In this regard, since it is unlikely that the data of length measuring sensor 42 is rapidly changed in a short time, it is preferable that the first time intervals have an hour unit or a day unit, e.g., once every hour, once every two hours, twice a day, once a day, or once every two days, etc. Further, it is preferable that the predetermined portion of the robot be measured when the position of slide 16 on which robot 12 is mounted is constant, and when the orientation (or the angular position of each axis) of robot 12 is also constant. Therefore, in the preferred embodiment, in each day when system 10 is operated, before a normal operation of system 10 is carried out, slide 16 is moved to a constant position on guide rail 18, and each motor of robot 12 is driven so that robot 12 represents a constant orientation. After that, length measuring sensor 42 measures the position of end effector 32 of robot 12 or the distance between end effector 32 and length measuring sensor 42. In this regard, the position of slide 16 or the orientation of robot 12 may be varied from day to day. However, in such a case, it is necessary to correct the measurement data of measuring sensor 42 by using an amount of change in the position or the orientation.

Figure 4:
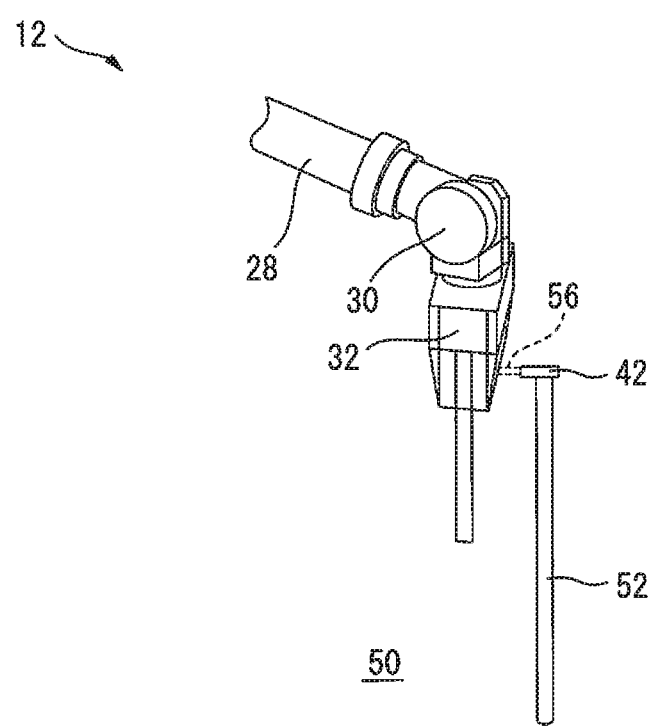
FIG. 4 exemplifies a state in which a distance between a predetermined portion of the robot and the length measuring sensor is measured by the sensor.

FIG. 4 exemplifies a state in which the portion of end effector 32 of robot 12 is measured by length measuring sensor 42. In many cases, when linear guide 22 is damaged, the predetermined portion of robot 12 is displaced in a normal direction perpendicular to an extending direction of guide rail 18, or in a direction including at least a component parallel to the normal direction. Therefore, it is preferable that the measuring direction of length measuring sensor 42 include a component perpendicular to the extending direction of guide rail 18, rather than a component parallel to the extending direction of guide rail 18. In the example of FIG. 4, the laser beam is irradiated in the direction perpendicular to the extending direction of guide rail 18, so as to measure the distance between end effector 32 and length measuring sensor 42.

In the next step S3, it is judged as to whether the distance (or the measurement value) between length measuring sensor 42 and end effector 32 measured by length measuring sensor 42 is within a range defined by a first predetermined threshold. Concretely, the position of end effector 32 (or the distance between end effector 32 and length measuring sensor 42) in a normal state is stored as a normal value in storing section 48, etc. Then, when the difference between the measurement value and the normal value is smaller than the first threshold (e.g., 2 mm), judging section 46 judges that the linear guide does not include an abnormality (or is not damaged) (step S4). When the linear guide does not include any abnormality, the damage detecting apparatus does not need to execute a particular process. However, the damage detecting apparatus may inform the operator that the linear guide does not have any abnormality, for example, may display such information on a display of robot controller 36, etc.

On the other hand, when the difference between the measurement value and the normal value is equal to or larger than the first threshold, the linear guide may be damaged. However, in this stage, the linear guide may not have an abnormality or may not be damaged, since robot 12 itself may be damaged or may have a structural distortion. Therefore, the procedure progresses to step S5, wherein a current value of drive motor 20 corresponding to the travelling axis motor is detected at predetermined second time intervals. For example, the second time interval may be set as a second unit, e.g., once every five seconds, or once every ten seconds, etc., and further, it is preferable that the second time interval be set as the same value as a program cycle. The program cycle, for example, means a time cycle of a program for carrying out a unit of motions which are repeatedly performed by robot 12 or linear guide 22 (e.g., the unit of motions includes: moving robot 12 gripping the article from one end to the other end of guide rail 18 by using slide 16; releasing the article by robot 12 at the other end of the guide rail; returning robot 12 to the one end of the guide rail; and gripping another article by robot 12). Since the motor current value are detected and registered in each of such program cycles in the normal operation, the obtained values may be easily sampled at the predetermined time intervals.

In the next step S6, it is judged as to whether the measured current value of the travelling axis motor is equal to or larger than a predetermined second threshold. For example, a current value of the motor in the normal state is previously stored as a normal value in storing section 48, etc. Then, when the measured value of the motor current at a certain time point is equal to or larger than the second threshold (e.g., corresponding to 1.2 times as large as the normal value), judging section 46 judges that the linear guide is damaged, and outputs an alarm so as to inform the operator of the judgment result (step S7). As the alarm, it is preferable that a message such as "linear guide damage" be displayed on a screen which can be easily viewed by the operator, or that an audible alarm be output, so that the alarm can be easily recognized by the operator. Instead of or in addition to the above alarm, data or a signal representing that the linear guide is damaged may be output to external equipment such as a host computer, and then the external equipment may inform the operator of the fact that the linear guide is damaged.

Generally, when the linear guide used as the travelling device for the robot is damaged (e.g., when a concave is generated on the slide or the guide rail), the actual position of a representative point (e.g., a tool center point) of the robot is deviated from the commanded position, whereby an operational error (e.g., a gripping error of the workpiece by the robot) may occur. When such an operational error occurs, the operator must suspend the system including the robot, investigate the cause of the operational error, and carry out a recovery work for the system, whereby a productive efficiency of the system may be lowered.

In the present embodiment, the distance between the predetermined portion of robot 12 and length measuring sensor 2 is measured by length measuring sensor 42, whereby the positional deviation of robot 12 can be detected before the operational error occurs. However, by just measuring the distance, it cannot be correctly judged as to whether the positional deviation is due to the damage to linear guide 22, or due to the structure of robot 12. Therefore, in the embodiment, when the current value of the travelling axis motor is equal to or larger than the second threshold, it can be judged that the current value is significantly increased from the normal state due to the damage to linear guide 22 and/or an increase in (frictional) resistance between slide 16 and guide rail 18 caused by deterioration of lubricant performance therebetween, and thus it can be judged that the positional deviation is due to the damage to linear guide 22, and then the alarm informing the damage thereof is output.

In other words, in the present disclosure, when the measurement value by length measuring sensor 42 is out of the range defined by the first threshold, and when the current value of drive motor 20 is equal to or higher than the second threshold, it is judged that linear guide 22 (i.e., slide 16 or guide rail 18) has a physical damage such as a dent or a scratch mark. In many cases, it is not necessary to immediately stop the system including the linear guide due to such a detected or judged damage to the linear guide. However, when the alarm generated in step S7 is neglected, a serious problem (e.g., that a ball is pushed out or removed from a ball-bearing between slide 16 and guide rail 18) may occur, by which the system must be immediately stopped. After the alarm in step S7 is output, the operator may review a schedule for carrying out maintenance, etc., of the linear guide, and then may carry out the maintenance at an appropriate time. By virtue of this, such a serious problem can be avoided.

On the other hand, even if the measurement value of length measuring sensor 42 is out of the range defined by the first threshold, when the current value of drive motor 20 is smaller than the second threshold, it can be judged that linear guide 22 does not include a damage, while the structure of robot 12 has an abnormality or distortion. Otherwise, when the measurement value of length measuring sensor 42 is within the range defined by the first threshold, and when the current value of drive motor 20 is larger than or equal to the second threshold, it is likely that an abnormality occurs in a speed reducer or a rack (if travelling unit 14 has a rack-and-pinion) of travelling unit 14, not in linear guide 22. Accordingly, in the present disclosure, the operator can correctly judge or find the portion in system 10 where the abnormality occurs, and thus can take appropriate measures for solving or remove the abnormality.

According to the present disclosure, by monitoring both the measurement result of the length measuring sensor and the current value of the motor, it can be correctly judged as to whether the content of the abnormality is the damage to the linear guide or not.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An apparatus for detecting damage to a linear guide having a slide on which a robot is mounted and a guide rail configured to guide the slide, the apparatus comprising:
   a length measuring sensor configured to measure a distance between a predetermined portion of the robot and a fixed position other than the robot;
   a current detecting section configured to detect a current value of a drive motor for driving the slide; and
   a judging section configured to, when the distance measured by the length measuring sensor is out of a range defined by a predetermined first threshold, and when the current value of the motor is equal to or higher than a predetermined second threshold, judge that the linear guide has been damaged.

2. The apparatus as set forth in claim 1, further comprising a storing section configured to store the first and second thresholds.

3. The apparatus as set forth in claim 1, wherein a length measuring direction of the length measuring sensor is perpendicular to an extending direction of the guide rail.

4. The apparatus as set forth in claim 1, wherein the judging section is configured to output an alarm, when judging that the linear guide has been damaged.

5. A method for detecting damage to a linear guide having a slide on which a robot is mounted and a guide rail configured to guide the slide, the method comprising the steps of:

storing predetermined first and second thresholds;

measuring a distance between a predetermined portion of the robot and a fixed position other than the robot;

detecting a current value of a drive motor for driving the slide; and judging, when the distance is out of a range defined by the first threshold, and when the current value of the motor is equal to or higher than the second threshold, that the linear guide has been damaged.

* * * * *